United States Patent [19]
Hill

[11] Patent Number: 4,988,739
[45] Date of Patent: Jan. 29, 1991

[54] METHOD OF IMPROVING FOAM FIRE RESISTANCE THROUGH THE INTRODUCTION OF METAL OXIDES THEREINTO

[75] Inventor: Francis U. Hill, San Diego, Calif.

[73] Assignee: Sorrento Engineering, Inc., National City, Calif.

[21] Appl. No.: 479,281

[22] Filed: Feb. 12, 1990

Related U.S. Application Data

[62] Division of Ser. No. 373,900, Jun. 30, 1989, Pat. No. 4,935,452.

[51] Int. Cl.⁵ .............................................. C08J 9/40
[52] U.S. Cl. ........................................ 521/55; 521/53; 521/184; 521/185; 521/189; 521/918
[58] Field of Search ................... 521/53, 55, 184, 185, 521/189, 918

[56] References Cited

U.S. PATENT DOCUMENTS 4,518,717  5/1985  Long et al. ............................. 54/185
4,520,071  5/1985  Noda et al. .......................... 521/185
4,814,356  3/1989  Dongers et al. ....................... 521/60

Primary Examiner—Morton Foelak
Attorney, Agent, or Firm—Frank D. Gilliam

[57] ABSTRACT

A method of improving the flame resistance of foams, such as open cell polyimide foams, through the introduction of finely divided metal oxide particles into the foam cells. A stable water suspension or gel is prepared using particles of metal oxides, such as aluminum oxide and silicon dioxide. An opacifier such as titanium dioxide may also be added. An open cell foam product is placed in the gel until the cells fill with the gel. Excess gel is removed and the foam is dried, leaving the metal oxide particles trapped in the cells. If desired, the foam may be post treated, such as by compression at the stabilizing temperature, resulting in a densified foam which further mechanically traps the particles.

2 Claims, 1 Drawing Sheet

METHOD OF IMPROVING FOAM FIRE RESISTANCE THROUGH THE INTRODUCTION OF METAL OXIDES THEREINTO

This is a divisional of co-pending application Ser. No. 07/373,900 filed on 6/30/89.

BACKGROUND OF THE INVENTION

This invention relates in general to foam products and, more specifically, to methods of improving the flame resistance of foam products.

Foamed plastics have long been used in a variety of thermal insulation applications. Some, such as polystyrene, melt at moderately elevated temperatures so are used only at approximately room temperature or below, such as in insulation of coolers or refrigerators. Others, such as polyimides, have excellent resistance to high temperatures and may be used in high temperature applications. In cases where the insulation must resist direct exposure to flame, the insulation generally required cover layers of metal, asbestos or the like which are heavy and present other problems.

Metal oxides in the sub-micron size range are known to have excellent thermal insulating capabilities. However, because of the small particle size and the fact that particles of oxides such as aluminum oxide and silicon dioxide take strong particle electrical charges, these materials have been difficult to handle and employ in insulation. Generally, they have only been used when enclosed, typically in a reservoir-type enclosure. Furthermore, the oxides are rather transparent in the infrared portion of the spectrum, compromising the otherwise good thermal insulating properties where large temperature differences exist across the particle mass.

Thus, there is a continuing need for improved insulation materials, resistant to high temperatures and flames.

SUMMARY OF THE INVENTION

The above-noted problems, and others, are overcome by preparing insulation by a method which basically comprises forming a stable suspension or gel of a suitable very finely divided metal oxide in a liquid, placing a suitable open-cell foam shape in the gel until all of the interstices are filled with the gel, then removing the shape and drying it to remove the liquid, leaving the metal oxide uniformly dispersed throughout the foam.

The suspension or gel has the property of preventing settling of the particles while remaining capable of easily flowing throughout the foam cells and wetting the cell walls.

Any suitable liquid may be used in forming the gel. Water is generally preferred for convenience, ready availability and low cost.

The particles may be any suitable metal oxide particles having the desired insulating properties. Typical metal oxides include aluminum oxide, silicon dioxide, titanium dioxide and mixtures thereof. For optimum results we prefer a mixture of aluminum oxide and silicon dioxide, at a ratio of about 1:6 by weight. While any suitable metal oxide particle size may be used, we prefer particles in the 10 to 40 nanometer diameter range. One particularly desirable metal particle composition is marketed by the Degussa Corporation, Allendale, NJ under the Aerosil COK84 designation. This material consists of 82 to 86 wt. % silicon dioxide and 14 to 18 wt % aluminum oxide having average particle sizes in the 10 to 80 nanometer range.

I prefer to include a small amount of very finely divided titanium dioxide in the gel. The titanium dioxide does not adversely affect the suspension properties of the gel. The titanium dioxide serves to opacify the foam/oxide product to infra-red radiation, reducing the amount of heat transferred across the insulation. Preferably, the particles size of the titanium dioxide is in the 10 to 80 nanometer range. Is preferable to use from about 0.1 to 10.0 weight percent titanium dioxide in the metal oxide mixture, based on the total weight of the other oxides in the mix.

Any suitable open-cell, high temperature resistant, synthetic resin foam may be treated by this method. Such foams may typically be formed from polyimides, polyurethanes, and other polymer foams. I prefer polyimides due to their particularly desirable high temperature and flame resistance and because they do not emit significant quantities of toxic gases when exposed to flame.

The gel may be introduced into the foam cells in any suitable manner. I have found it most convenient to simply gently submerge the foam in the gel for a period sufficient to allow the gel to fully fill the cells concurrent with hand rolling of the foam to alternately compress and release the foam. The foam is then removed from the gel passed through pinch rolls to leave in an exact predetermined amount of gel, and thereby the desired amount of metal oxides. The filled wet foam is then dried, such as by heating in a conventional thermal oven. The foam insulation is then ready for use or any suitable post-treatment.

BRIEF DESCRIPTION OF THE DRAWING

Details of the invention, and of certain preferred embodiments thereof, will be further understood upon reference to the drawing, wherein:

The Figure shows a schematic flow diagram of a preferred series of steps making up the insulation manufacturing method.

DETAILED DESCRIPTION OF PREFERRED EMBODIMENTS

Figure 1:
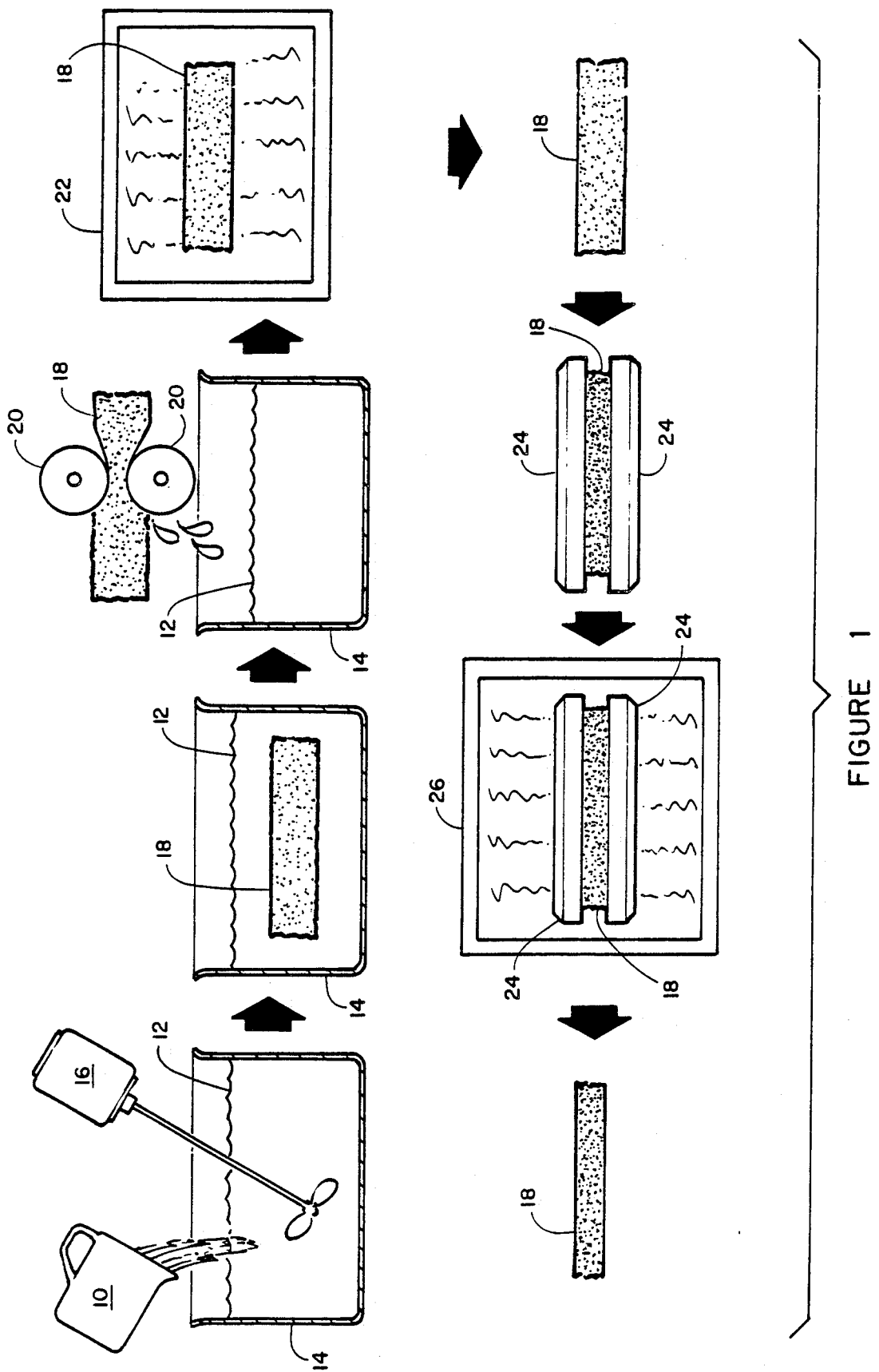

As seen in the Figure, the first step is to pour the finely divided metal oxides from a container 10 into a suitable liquid 12, such as water, in a container 14 using a conventional mixer 16 until a uniform suspension or gel is formed.

A sheet of open-cell foam 18 is then submerged in the liquid 12 until all foam interstices are filled with the gel, generally indicated by cessation of air bubbles emitting from the foam. A simple hand roller moved across the foam in the liquid is effective in reducing the time necessary to complete filling of the cells.

While other open-cell foams may be used, as discussed above, we prefer polyimides. Typical polyimide foams include the open-celled foams disclosed by Gagliani et al in U.S. Pat. Nos. 4,426,463, 4,439,381 and 4,506,038, by Long et al in U.S. Pat. No. 4,518,717 and by Shulman et al in U.S. Pat. No. 4,467,597.

The foam may incorporate any suitable additives, such as surfactants to improve uniformity of cell structure, blowing agents, fillers, reinforcements, or other agents as desired. Typical surfactants include BRIJ-78 from ICI Corp., FSN and Zonyl from E.I. DuPont de Nemours & Co., L5302 and L5430 from Union Carbide Corp., 190 and 193 from Dow Corning Corp. and FC 430 from Minnesota Mining and Manufacturing Co. While any suitable concentration may be used, generally from about 0.5 to 2 wt % (based on the weight of the liquid foam precursor) is preferred. Typical fillers include glass microballoons, fiber of glass, graphite, Kevlar aramids, ceramics or the like, fluorocarbon powders, etc.

In order to adjust the quantity of gel, and resulting metal oxides, in the foam, the foam may then be run through the nip between spaced rollers 20. The spacing between the rollers is adjusted to leave the selected amount of gel in the foam. Excess gel is allowed to fall back into container 14. Of course, if the maximum amount of gel (and resulting metal oxide) in the foam is desired, this step may be eliminated. While the rollers as shown are preferred for ease and convenience, other methods may be used to squeeze out excess gel, such as compression between two opposing platens.

Next, the foam is dried in an oven 22 leaving the finely divided metal oxides uniformly dispersed throughout the foam cells. Any suitable method may be used to dry the foam, including simply air drying at room temperature. A conventional circulating air thermal oven is preferred for speed and simplicity.

Upon removal from the oven, the sheet of metal oxide impregnated foam 18 is ready for use in high-temperature insulation applications. However, for many such applications, further post-treatment of the foam may be beneficial.

Often, foam of higher density and greater strength may be desired with at least some of the open cells closed. As seen in the next step, the foam 18 may be squeezed to a lesser thickness between a pair of opposed compression tools 24. The assembly of tools and foam is then placed in a suitable oven 26 and heated to the stabilization temperature of the foam, at which temperature the foam is set in the new shape. Any suitable oven may be used, such as a conventional circulating air thermal oven.

In the case of polyimide foam, foam density can be increased as much as 1500 percent without significantly degrading its thermal resistance. The densification step improves flame resistance and rigidity. Also, densification tends to collapse the cells in the foam, effectively trapping the metallic oxides in the foam. The dimensions of the final foam shape are stabilized by the densification step so that the final product closely fits the dimensions of the tooling. This permits the production of highly accurate parts using inexpensive tooling.

If desired, compression tools 24 may have any of a variety of suitable shapes. For example, one could be concave and the other correspondingly convex, producing a final foam product having a curved shape. Or, the face of one or both tools 24 could be configured to produce a corresponding surface pattern on the final foam sheet. Complex shapes, such as distorted tubes can be made by laying up the assembly components on a mold surface prior to full drying in oven 22, then heating to dry and set the foam to fit the mold. Alternatively, a plurality of thin pliable dried sheets can be assembled on a curved mold in place of compression tools 24 and heated and compressed to produce a complex final stabilized foam product.

Face sheets or other articles may be bonded to foam 18 during the densification and stabilization step. For example a sheet of material, such as a fiberglass fabric or the like having a heat activated adhesive on one side could be placed on foam 18 with the adhesive contacting the foam just prior to placing the foam between compression tools 24.

The final product, then, is a sheet of foam insulation having an accurate shape and outstanding resistance to high temperatures and direct flame contact. The products may be further adhesively bonded together into thicker or more complex products.

The following Examples provide further details of certain preferred embodiments of the method of my invention. Parts and percentages are by weight unless otherwise indicated.

EXAMPLE I

About 150 grams of Monsanto 2601 Skybond polyimide prepolymer is mixed with about 2 wt % Dow-Corning 193 surfactant. The solution is rolled onto glass plates and dried with warm air at about 150° F. The dried coating is scraped off the glass and ground to a powder in a standard kitchen blender. The powder is then spread onto Teflon fluorocarbon coated glass fabric and foamed in a circulating air oven heated to about 350° F. for about 45 minutes. After foaming, the temperature is increased to about 575° F. for about 1 hour to cure the polyimide. The resulting flexible open-cell foam is trimmed to a thickness of just over 0.5 inch. The foam is immersed in a pan containing a soupy gel made by mixing about 0.5 grams of Aerosil COK84 in 300 ml. water. About 15 grams of P-25 powdered titanium dioxide from Degussa is then mixed into the gel. The foam is gently rolled with a hand roller while in the gel until it is loaded with gel. The foam is then removed from the gel and passed through pinch rolls set about 3/16 inch apart which removes much of the trapped gel. The foam is then dried for about 1 hour at about 250° F. in a conventional thermal oven.

The product is a foam which is highly resistant to direct flame when placed over a bunsen burner, when compared with a similar piece of untreated foam.

EXAMPLE II

A sheet of the foam made by the method of Example I is placed between two flat, mold-release coated, platens and compressed to a thickness of about 0.25 inch. The assembly of platen and foam is placed in a thermal oven and heated to about 550° F. for about 30 minutes. The assembly is removed from the oven and cooled to room temperature. The foam is removed from the platens and found to have an increased resistance to flame when compared to the product of Example I, to have greater rigidity and to be dimensionally stable.

EXAMPLE III

The method of Example II is repeated except that the two platens have corresponding, parallel, convex and concave shapes, A face sheet is prepared by dusting a sheet of fiberglass fabric with Skybond prepolymer, then placing the foam against the dusted surface. This laminate is then placed between the curved platens, which are brought together to a spacing of about 0.2 inch. The assembly is placed in a thermal oven and heated to about 550° F. for about 30 minutes. Upon removal from the oven, cooling to room temperature and removal from the platens, a dimensionally stable foam sheet having surfaces corresponding to the platen surface and having the face sheet well bonded to one surface results.

EXAMPLE IV

A gel is prepared as in Example I above. Polyimide foam 1-inch thick and 12-inches square manufactured by Imitech Division of Ethyl Corp. is immersed, removed, and squeezed out as described in Example I. The sample is thoroughly dried and then placed between two aluminum tooling plates having Teflon coated fiberglass as mold releases. The two plates reduce the thickness of the foam to about ¼ inch. The assembly is then heated to about 450° F. for about 1 hour. The resulting product accurately matches the tooling, has reduced cell size, increased density, and has greatly improved flame resistance when exposed to a bunsen burner flame, as compared to the untreated foam.

Certain specific materials, amounts and conditions were specified in the above descriptions of preferred embodiments. These may be varied, where suitable, with similar results. Other variations, applications and ramifications of this invention will occur to those skilled in the art upon reading to this application. Those are intended to be included within the scope of this invention, as defined in the appended claims.

I claim:

1. A flame resistance of open-cell polyimide foam product produced from the following method which comprises the steps of:
    adding very finely divided metal oxide particles to water or a highly polar organic liquid to form a gel;
    placing an open-cell synthetic resin foam product in said gel;
    manipulating said foam product so as to substantially entirely fill said cells with gel;
    removing said foam product; and
    drying said foam product;
    whereby metal oxide particles remain dispersed throughout said cells.

2. An improved flame resistant open-cell polyimide foam product produced from the following method which comprises the steps of:
    providing a mixture of very finely divided aluminum oxide and silicon dioxide particles, in a weight ratio of about 1:6 and up to about 10 wt % finely divided titanium dioxide particles, based on the total weight of aluminum oxide and silicon dioxide particles;
    adding said mixture of particles to water or a highly polar organic liquid to form a gel;
    placing an open-cell polyimide foam product in said gel;
    manipulating said foam product so as to substantially entirely fill said cells with gel;
    removing said foam product;
    passing said foam product through the nip between a pair of spaced rolls, said spacing selected to squeeze out all but a selected quantity of gel from said foam product; and
    drying said foam product;
    whereby metal oxide particles remain dispersed throughout said cells.

* * * * *